US008085926B2

(12) United States Patent
Boughton et al.

(10) Patent No.: US 8,085,926 B2
(45) Date of Patent: Dec. 27, 2011

(54) CALL FLOW STAFFING ESTIMATION TOOL

(75) Inventors: James N. Boughton, Kennesaw, GA (US); Salvatore Cino, Charlotte, NC (US); Charles R. Simmons, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1371 days.

(21) Appl. No.: 11/426,948

(22) Filed: Jun. 28, 2006

(65) Prior Publication Data

US 2008/0037760 A1 Feb. 14, 2008

(51) Int. Cl.
*H04M 3/00* (2006.01)
(52) U.S. Cl. .......... 379/265.02; 379/265.03; 379/266.04
(58) Field of Classification Search . 379/265.02–265.03
See application file for complete search history.

(56) References Cited

U.S. PATENT DOCUMENTS

| | | | | |
|---|---|---|---|---|
| 5,185,780 A | * | 2/1993 | Leggett | 379/265.08 |
| 6,278,777 B1 | * | 8/2001 | Morley et al. | 379/265.02 |
| 7,369,654 B2 | * | 5/2008 | Parker | 379/266.1 |
| 2002/0143597 A1 | | 10/2002 | Andre et al. | |
| 2005/0065837 A1 | | 3/2005 | Kosiba et al. | |
| 2005/0129212 A1 | | 6/2005 | Parker | |
| 2007/0041545 A1 | * | 2/2007 | Gainsboro | 379/188 |

* cited by examiner

*Primary Examiner* — Rasha Al Aubaidi
(74) *Attorney, Agent, or Firm* — William Schiesser; Hoffman Warnick LLC

(57) ABSTRACT

A call flow staffing estimation tool that includes: generating a staffing impact chart that indicates, in a visually indicated display, an expected difference between call volume and available agents for a plurality of time intervals in a future period of time based on a plurality of inputs, the plurality of inputs including: historical call volume data to a call center, a prospective schedule of agents servicing the call center, and an average handing time of calls to the call center by the agents, wherein historical call volume data which is skewed data is ignored and predetermined representative data is substituted for the skewed data; providing a variable table having a plurality of variables, each variable including a scaling value that modifies at least one of the plurality of inputs used in generating the staffing impact chart; selectively changing, by a user, at least one of the variables in the variable table; and immediately updating the staffing impact chart to reflect modified expected differences for each of the plurality of time intervals based on application of the change to the plurality of inputs.

19 Claims, 14 Drawing Sheets

| Start Time (EST) | End Time | Monday | Tuesday | Wednesday | Thursday | Friday | Saturday | Sunday | M-F AVG |
|---|---|---|---|---|---|---|---|---|---|
| 12:00 AM | 12:30 AM | 1.6 | 1.9 | 2.6 | 2.3 | 1.1 | 2.3 | 0.9 | 1.9 |
| 12:30 AM | 1:00 AM | 1.7 | 1.0 | 1.4 | 2.2 | 1.1 | 2.1 | 1.4 | 1.5 |
| 1:00 AM | 1:30 AM | 0.9 | 1.7 | 1.0 | 0.3 | 0.7 | 0.7 | 1.1 | 0.9 |
| 1:30 AM | 2:00 AM | 1.0 | 0.6 | 0.9 | 0.2 | 0.6 | 0.9 | 1.1 | 0.6 |
| 2:00 AM | 2:30 AM | 1.1 | 0.7 | 0.9 | 0.7 | 0.7 | 0.7 | 1.3 | 0.8 |
| 2:30 AM | 3:00 AM | 0.4 | 0.7 | 0.9 | 0.4 | 0.5 | 0.4 | 0.2 | 0.6 |
| 3:00 AM | 3:30 AM | 0.1 | 0.7 | 0.9 | 1.0 | 0.1 | 0.3 | 0.4 | 0.5 |
| 3:30 AM | 4:00 AM | 0.4 | 0.4 | 0.9 | 0.3 | 0.1 | 0.1 | 0.6 | 0.8 |
| 4:00 AM | 4:30 AM | 2.3 | 0.4 | 1.1 | 0.7 | 1.1 | 0.3 | 0.9 | 1.0 |
| 4:30 AM | 5:00 AM | 1.4 | 1.4 | 1.1 | 1.2 | 2.9 | 1.3 | 0.4 | 1.8 |
| 5:00 AM | 5:30 AM | 2.0 | 3.2 | 3.1 | 1.1 | 2.6 | 1.1 | 0.4 | 2.4 |
| 5:30 AM | 6:00 AM | 3.1 | 3.1 | 2.9 | 3.9 | 4.1 | 2.4 | 0.6 | 3.3 |
| 6:00 AM | 6:30 AM | 6.0 | 4.3 | 5.1 | 6.4 | 5.8 | 2.7 | 2.5 | 5.4 |
| 6:30 AM | 7:00 AM | 10.0 | 8.4 | 6.9 | 8.3 | 6.7 | 5.1 | 1.7 | 8.1 |
| 7:00 AM | 7:30 AM | 13.9 | 12.3 | 10.8 | 11.9 | 12.4 | 5.6 | 1.8 | 12.6 |
| 7:30 AM | 8:00 AM | 24.5 | 23.4 | 16.0 | 20.6 | 16.0 | 8.0 | 2.6 | 20.1 |
| 8:00 AM | 8:30 AM | 28.0 | 22.9 | 23.1 | 20.9 | 17.0 | 12.4 | 4.0 | 24.0 |
| 8:30 AM | 9:00 AM | 42.7 | 30.6 | 28.0 | 25.0 | 26.3 | 10.3 | 6.7 | 30.5 |
| 9:00 AM | 9:30 AM | 55.5 | 37.6 | 29.1 | 30.7 | 35.0 | 13.7 | 6.6 | 37.7 |
| 9:30 AM | 10:00 AM | 47.0 | 41.1 | 33.9 | 34.2 | 32.1 | 15.6 | 5.4 | 37.7 |
| 10:00 AM | 10:30 AM | 40.4 | 32.9 | 34.4 | 40.9 | 32.1 | 15.1 | 7.6 | 36.2 |
| 10:30 AM | 11:00 AM | 37.0 | 36.9 | 36.4 | 42.3 | 33.6 | 15.4 | 9.6 | 37.2 |
| 11:00 AM | 11:30 AM | 45.0 | 47.4 | 38.1 | 33.0 | 31.4 | 17.7 | 10.1 | 39.0 |
| 11:30 AM | 12:00 PM | 43.4 | 40.4 | 39.1 | 32.8 | 29.0 | 15.4 | 11.3 | 37.0 |
| 12:00 PM | 12:30 PM | 44.3 | 48.4 | 40.3 | 36.5 | 32.3 | 12.0 | 13.9 | 36.9 |
| 12:30 PM | 1:00 PM | 42.4 | 40.6 | 33.1 | 33.0 | 35.1 | 14.1 | 8.9 | 36.9 |
| 1:00 PM | 1:30 PM | 40.9 | 48.3 | 35.1 | 32.3 | 33.4 | 12.0 | 10.3 | 36.4 |
| 1:30 PM | 2:00 PM | 41.3 | 42.7 | 42.1 | 30.0 | 28.4 | 16.7 | 10.3 | 36.9 |
| 2:00 PM | 2:30 PM | 42.9 | 36.6 | 35.8 | 35.4 | 36.0 | 13.3 | 10.1 | 37.3 |
| 2:30 PM | 3:00 PM | 43.6 | 31.9 | 30.3 | 34.0 | 35.4 | 17.6 | 6.6 | 35.0 |
| 3:00 PM | 3:30 PM | 32.0 | 24.9 | 31.4 | 34.1 | 26.3 | 15.3 | 8.7 | 31.7 |
| 3:30 PM | 4:00 PM | 33.7 | 28.1 | 31.1 | 25.0 | 29.7 | 15.4 | 7.9 | 29.6 |

| | A | B | C | D | E | F | G | H |
|---|---|---|---|---|---|---|---|---|
| | | Absence Table | Place an X in the box for the day of the absence | | | | | |
| 59 | | | | | | | | |
| 60 | Agent | Sunday | Monday | Tuesday | Wednesday | Thursday | Friday | Saturday |
| 61 | Agent 1 | | | | | | | |
| 62 | Agent 2 | X | X | X | X | X | X | X |
| 63 | Agent 3 | | X | X | | | | |
| 64 | Agent 4 | | | | | | | |
| 65 | Agent 5 | | | | | | | |
| 66 | Agent 6 | X | | | | | | |
| 67 | Agent 7 | X | X | X | X | X | X | X |
| 68 | Agent 8 | | X | X | X | X | X | X |
| 69 | Agent 9 | | | | | | | |
| 70 | Agent 10 | | | | | | | |
| 71 | Agent 11 | | | | | | | |
| 72 | Agent 12 | | | | | | | |
| 73 | Agent 13 | | | | | | | |
| 74 | Agent 14 | | | | | | | |
| 75 | Agent 15 | | | | | | | |
| 76 | Agent 16 | | | | | | | |
| 77 | Agent 17 | | | | | | | |
| 78 | Agent 18 | X | X | X | X | X | X | X |
| 79 | Agent 19 | | | | | | | |
| 80 | Agent 20 | | | | | | | |
| 81 | Agent 21 | | | | | | | |
| 82 | Agent 22 | | | | | | | |
| 83 | Agent 23 | | | | | | | |
| 84 | Agent 24 | | | | | | | |

FIG. 7

CALL FLOW STAFFING ESTIMATION TOOL

FIELD OF THE INVENTION

The present invention generally relates to staffing requirements, and more specifically relates to a call flow staffing estimation tool.

BACKGROUND OF THE INVENTION

Scheduling and call volume tracking are historically some of the biggest problems in a call center environment. Having too many agents staffed, or too few, can have large-scale impacts on a business. The inability to respond to changes instantaneously can lead to the loss of business. Although there are call monitoring tools that show current call volume and can be searched for historical call volume, such tools only provides raw data that must be interpreted by a user.

SUMMARY OF THE INVENTION

In general, the present invention provides a call flow staffing estimation tool which allows a user to predict call volume based on previous call arrival patterns and to make instant changes to account for unexpected variables. To this extent, the call flow staffing estimation tool of the present invention allows a user to make staffing decisions proactively based on both historical and real-time data.

A first aspect of the present invention is directed to a method for predicting call volume, comprising: generating a staffing impact chart that indicates, in a visually indicated display, an expected difference between call volume and available agents for a plurality of time intervals in a future period of time based on a plurality of inputs, the plurality of inputs including: historical call volume data to a call center, a prospective schedule of agents servicing the call center, and an average handing time of calls to the call center by the agents, wherein historical call volume data which is skewed data is ignored and predetermined representative data is substituted for the skewed data; providing a variable table having a plurality of variables, each variable including a scaling value that modifies at least one of the plurality of inputs used in generating the staffing impact chart; selectively changing, by a user, at least one of the variables in the variable table; and immediately updating the staffing impact chart to reflect modified expected differences for each of the plurality of time intervals based on application of the change to the plurality of inputs.

A second aspect of the present invention is directed to a system for predicting call volume, comprising: a system for generating a staffing impact chart that indicates, in a visually indicated display, an expected difference between call volume and available agents for a future period of time based on a plurality of inputs, the plurality of inputs including: historical call volume data to a call center, a schedule of agents servicing the call center, and an average handing time of calls to the call center by the agents, wherein historical call volume data which is skewed data is ignored and predetermined representative data is substituted for the skewed data; a system for providing a variable table having a plurality of variables, each variable including a scaling value that modifies at least one of the plurality of inputs used in generating the staffing impact chart; a system for selectively changing, by a user, at least one of the variables in the variable table; and a system for immediately updating the staffing impact chart to reflect modified expected differences for each of the plurality of time intervals based on application of the change to the plurality of inputs.

A third aspect of the present invention is directed to program product stored on a computer readable storage medium for predicting call volume, the computer readable storage medium comprising program code for: generating a staffing impact chart that indicates, in a visually indicated display, an expected difference between call volume and available agents for a plurality of time intervals in a future period of time based on a plurality of inputs, the plurality of inputs including: historical call volume data to a call center, a prospective schedule of agents servicing the call center, and an average handing time of calls to the call center by the agents, wherein historical call volume data which is skewed data is ignored and predetermined representative data is substituted for the skewed data; providing a variable table having a plurality of variables, each variable including a scaling value that modifies at least one of the plurality of inputs used in generating the staffing impact chart; selectively changing, by a user, at least one of the variables in the variable table to the generating step; and immediately updating the staffing impact chart to reflect modified expected differences for each of the plurality of time intervals based on application of the change to the plurality of inputs.

A fourth aspect of the present invention is directed to a method for deploying an application for predicting call volume, comprising: providing a computer infrastructure being operable to: generate a staffing impact chart for a future period of time based on historical call volume data to a call center, a schedule of agents servicing the call center, and an average handing time of calls to the call center by the agents; selectively change an input to the generating step; and immediately update the staffing impact chart to reflect the change.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an illustrative weekly average historical call volume chart based on seven daily historical call volume charts, such as the daily historical call volume chart shown in FIG. 3, in accordance with an embodiment of the present invention.

FIG. 3 depicts an illustrative daily historical call volume chart in accordance with an embodiment of the present invention.

FIG. 4 depicts an illustrative estimated staffing chart generated by a call flow staffing estimation tool in accordance with an embodiment of the present invention.

FIG. 6 depicts an illustrative absence table in accordance with an embodiment of the present invention.

FIG. 7 depicts the absence table of FIG. 6 with several agents marked as absent.

FIG. 10 depicts an illustrative overtime chart in accordance with an embodiment of the present invention.

Figure 1:
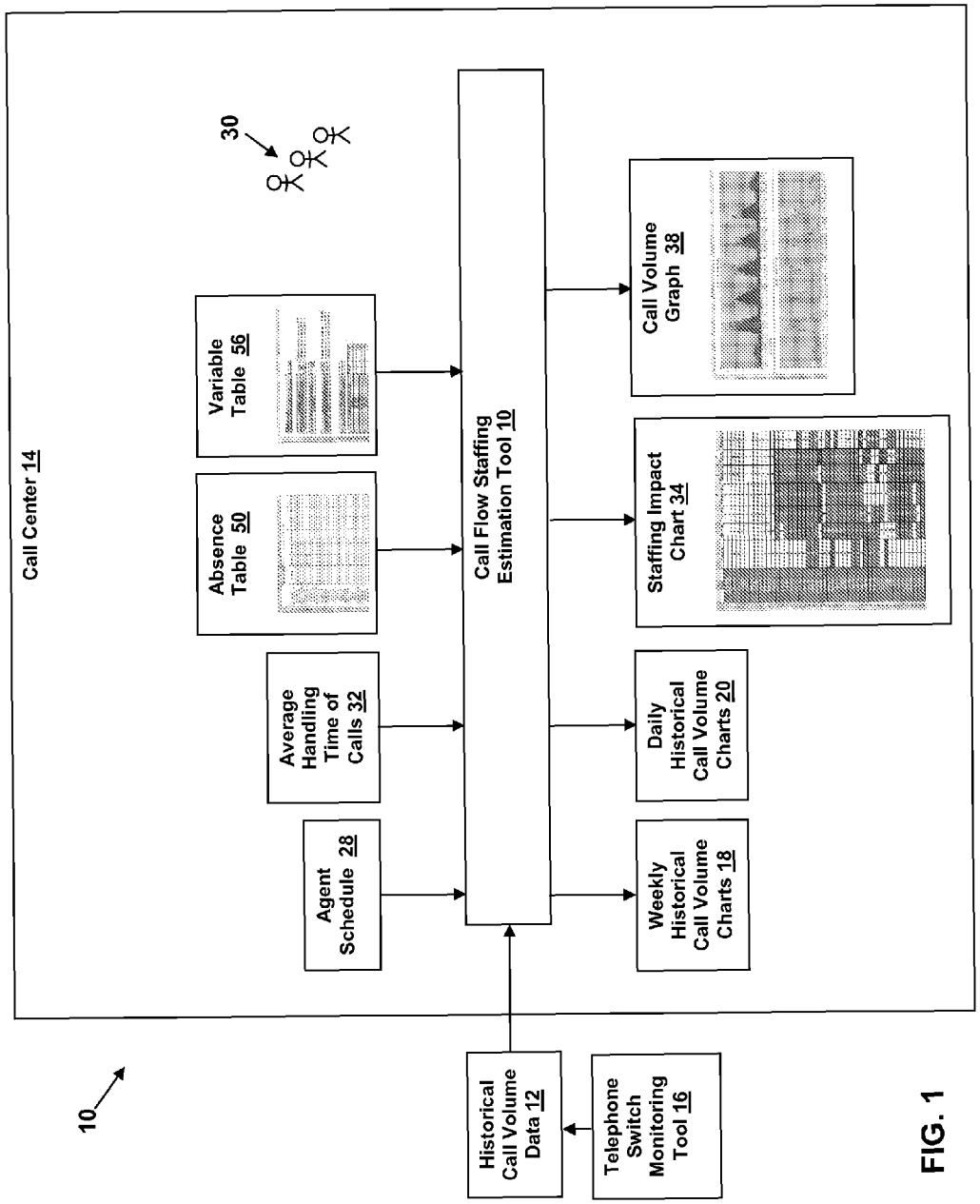
FIG. 1 depicts an illustrative call flow staffing estimation tool in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

A call flow staffing estimation tool 10 (hereafter referred to as an "estimation tool 10") in accordance with an embodiment of the present invention is depicted in FIG. 1. The estimation tool 10 pulls in, or is otherwise provided with, historical call volume data 12 associated with a call center 14. The historical call volume data 12 can be provided by a telephone switch monitoring tool 16 or using any other suitable system. The estimation tool 10 uses the historical call volume data 12 to predict future call volume.

Figure 3:
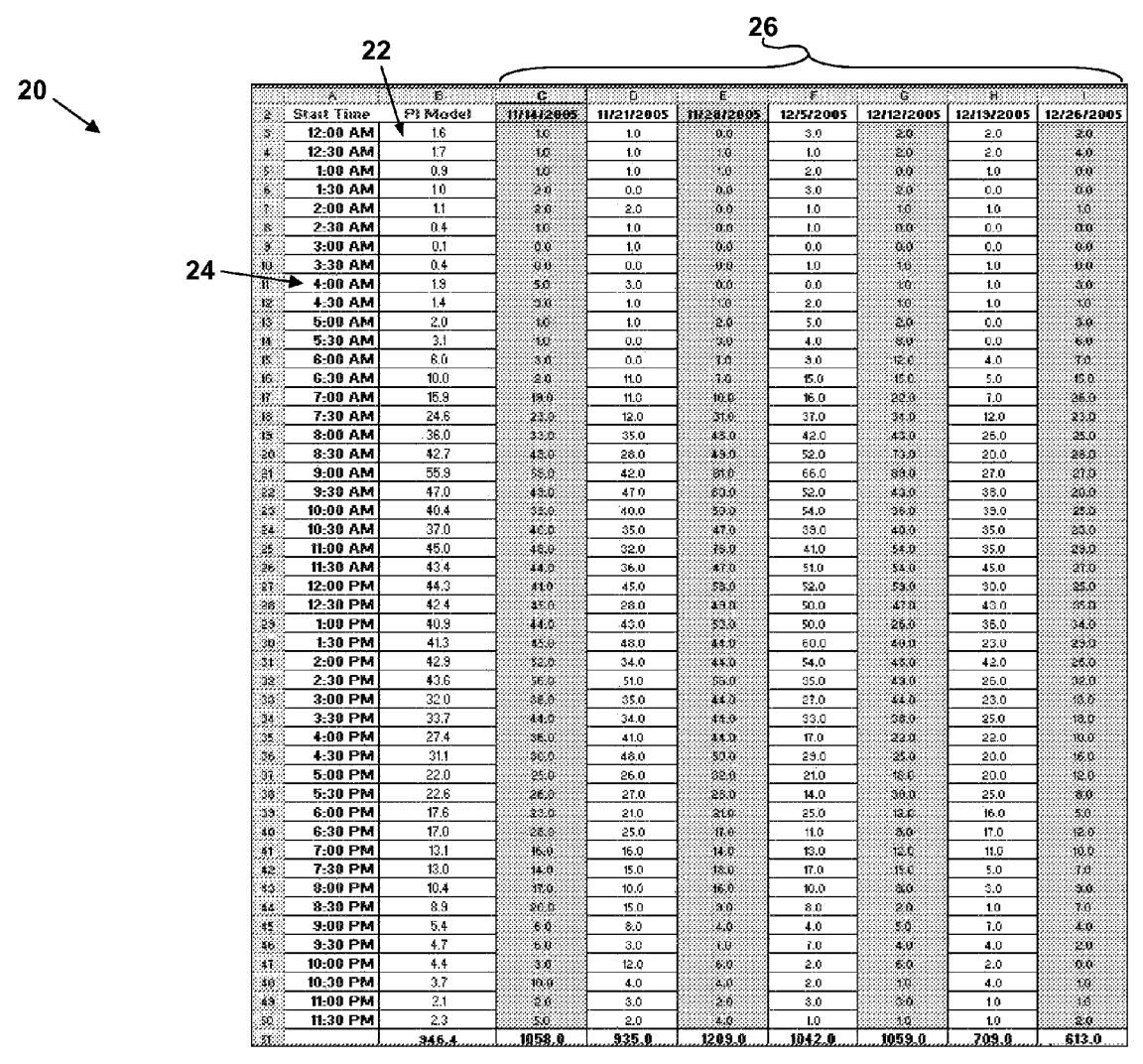

The estimation tool 10 filters the historical call volume data 12 and generates weekly (e.g., 24 hours by 7 days) historical call volume charts 18 and daily (e.g., 24 hours) historical call volume charts 20. An illustrative weekly historical call volume chart 18 is depicted in FIG. 2. An illustrative daily historical call volume chart 20 is depicted in FIG. 3.

The weekly historical call volume chart 18 displays average call volume data 22 for a given week, split into a plurality of time intervals 24 (e.g., 30 minute increments). Each daily historical call volume chart 20 displays the average call volume data 22 for a given day of the week, split into a plurality of time intervals 24 (e.g., 30 minute increments). The weekly historical call volume chart 18 is populated with data from corresponding daily historical call volume charts 20. In the example shown in FIG. 3, the average call volume data 22 for a given time interval on a Monday, displayed in column B, is calculated by determining the average of the historical call volume data 26 for that time interval, displayed in columns C through I, over the previous seven weeks. The number of weeks of historical call volume data 26 used to determine the average call volume data 22 can vary, and is not limited to seven as in the example above.

The estimation tool 10 can be configured to ignore skewed data and to instead use a more representative value when determining the average call volume data 22. For instance, if the historical call volume data 26 for a given time interval on one of the previous seven Mondays was 300% more than the historical call volume data 26 for that time interval on any of the other six previous Mondays, the estimation tool 10 can be configured using a chosen variable 63 (see FIG. 11) to calculate the average call volume data 22 using only the historical call volume 26 for the other six previous Mondays, substituting that data for the skewed data.

A schedule 28 of the agents 30 servicing the call center 14 is also provided to the estimation tool 10. Also provided to the estimation tool 10 is the average handling time 32 of calls to the call center by the agents 30. The schedule 28 can be provided in any suitable manner. The average handling time 32 can be computed by examining the number of calls handled by the agents 30 in a given period of time (e.g., calls handled/8-hour shift) or in any other suitable manner.

Figure 4:
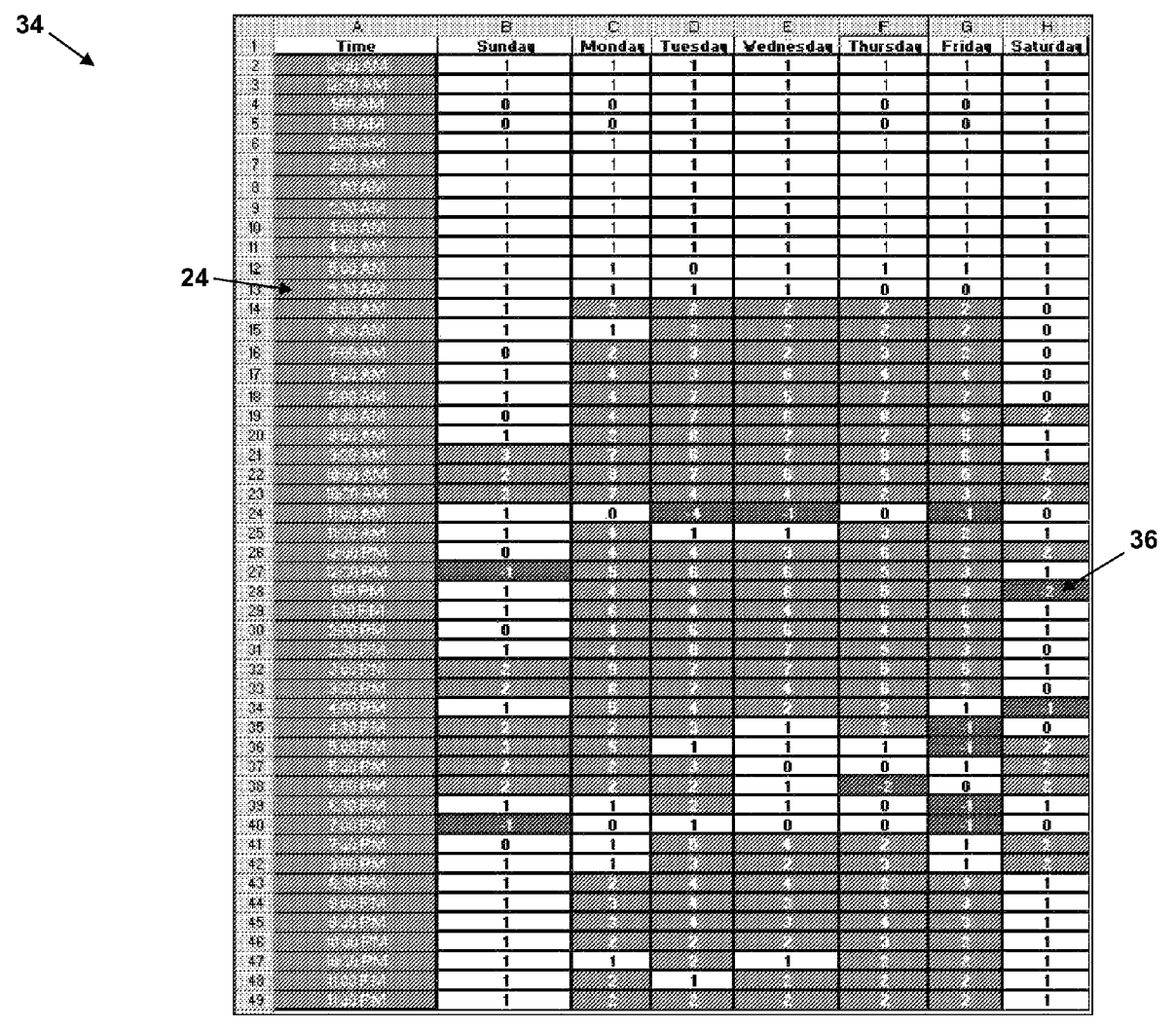

Based on the historical call volume data as provided in the weekly and/or daily historical call volume charts 16, 18, the schedule 28 of the agents 30 servicing the call center 14, and the average handling time 32 of calls to the call center 14 by the agents 30, the estimation tool 10 generates a staffing impact chart 34 for a future period of time. For example, the estimation tool 10 can generate a staffing impact chart 34 for a given week based on the previous week's data, based on data for that week from last year, etc. An illustrative staffing impact chart 34 generated by an estimation tool 10 of the present invention is depicted in FIG. 4. The staffing impact chart 34 provides, for each time interval 24, a positive/negative number 36 representative of the estimated staffing need during that time interval 24. In this example, a positive number 36 represents a staffing surplus, while a negative number 36 represents a staffing deficit. Color coding can also be used to indicate the estimated staffing need during each time interval 24 in the staffing impact chart 34. For example, in the staffing impact chart 34 depicted in FIG. 4, "white" is used to indicate adequate staffing, "gray" is used to indicate an overstaffing condition, while "red" is used to indicate an understaffing condition. Other indicia, colors, etc., can also be used to indicate estimated staffing need in the staffing impact chart 34. Thus, from the staffing impact chart 34, a user can easily determine for the time interval 24 from 11:00 AM to 11:30 AM:

Sunday—Overstaffed by 1 agent;
Monday—Ideal staffing;
Tuesday—Understaffed by 4 agents;
Wednesday—Understaffed by 1 agent;
Thursday—Ideal staffing;
Friday—Understaffed by 1 agent; and
Saturday—Ideal staffing.

Figure 5:
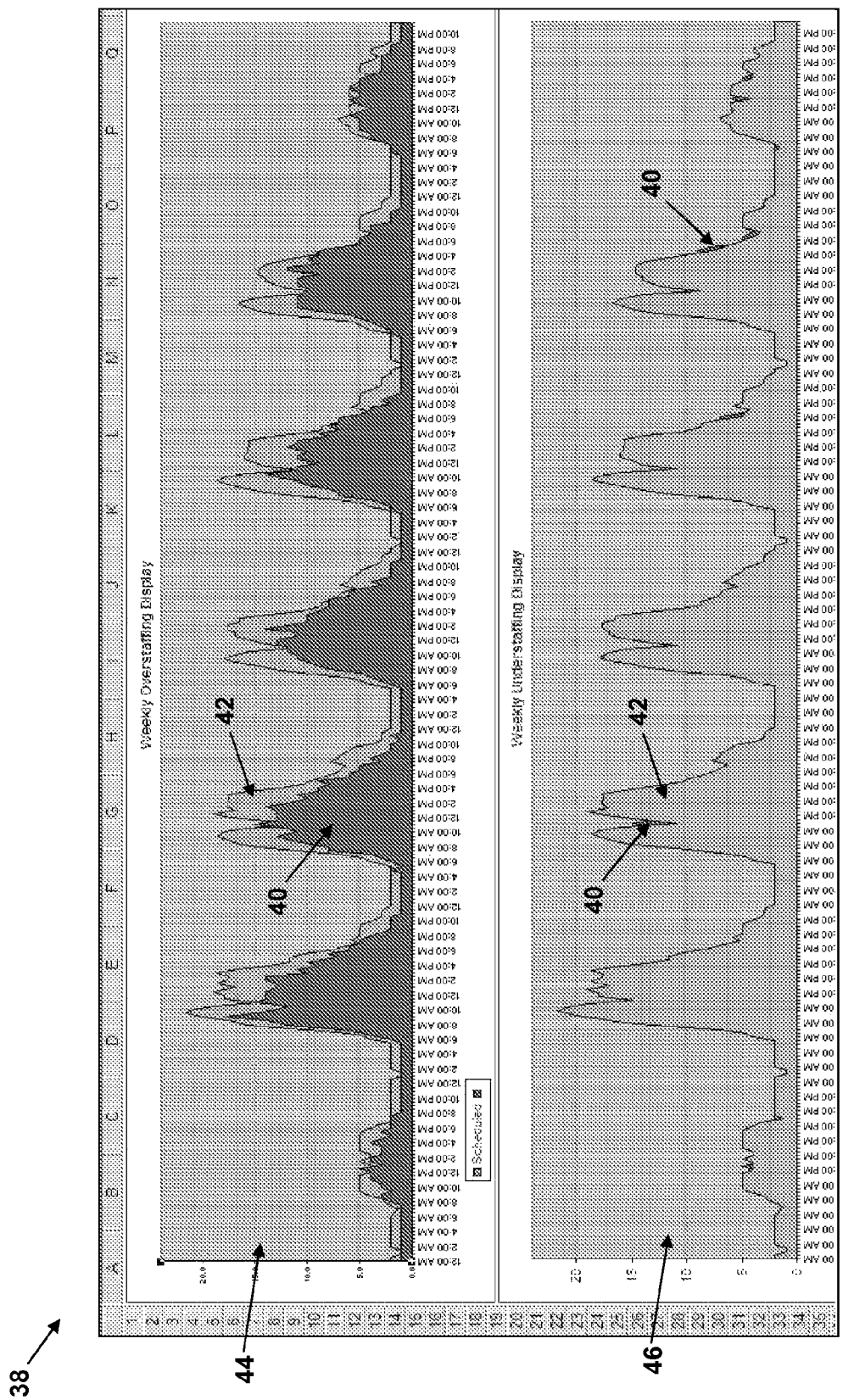
FIG. 5 depicts an illustrative graph of estimated call volume and call volume capability generated by a call flow staffing estimation tool in accordance with an embodiment of the present invention.

As depicted in FIG. 1, and in greater detail in FIG. 5, the estimation tool 10 of the present invention can also be configured to provide a call volume graph 38 that shows, for a given period of time (e.g., a full week), the estimated call volume 40 and the call volume capability 42 provided by the planned staffing coverage. In the upper portion 44 of the call volume graph 38, the estimated call volume 40 is displayed over the call volume capability 42. This allows a user to quickly and easily determine when overstaffing conditions are likely to occur. In the lower portion 46 of the call volume graph 38, the call volume capability 42 is displayed over the estimated call volume 40. This allows a user to quickly and easily determine when understaffing conditions are likely to occur.

As shown in FIG. 1, an absence table 50 can also be provided to the estimation tool 10. The absence table 50 is shown in greater detail in FIG. 6. The absence table 50 allows a user to dynamically adjust the schedule of one or more agents 30 in the call center 14. The impact of removing agents 30 via changes to the absence table 50 is immediately reflected on the corresponding staffing impact chart 34 and call volume graph 38. For Example, if Agent 1 calls in sick, a user can quickly and easily determine from the corresponding staffing impact chart 34 what type of impact the agent's absence will have today, for the entire week, etc.

Figures 6, 10:
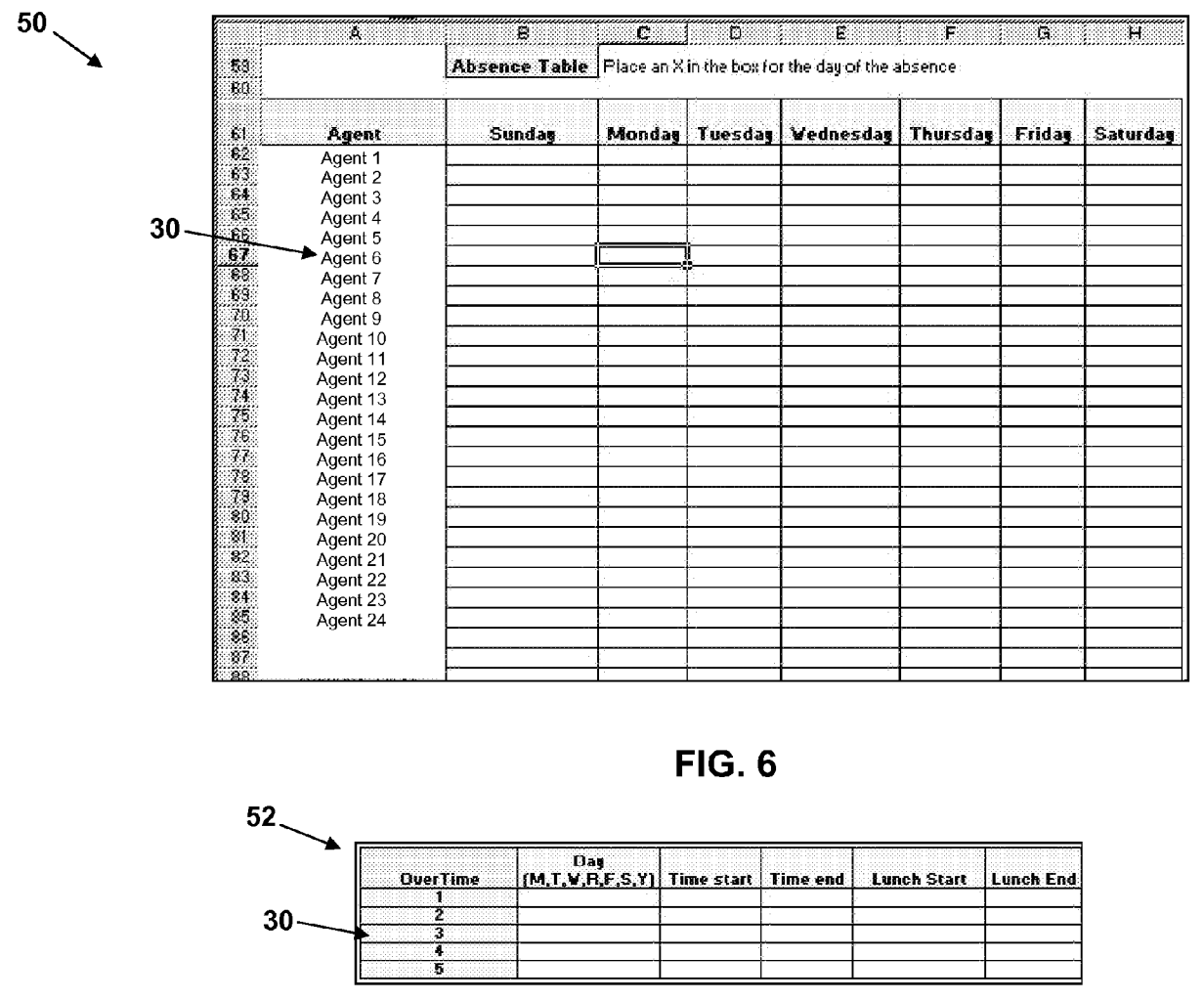
Figure 8:
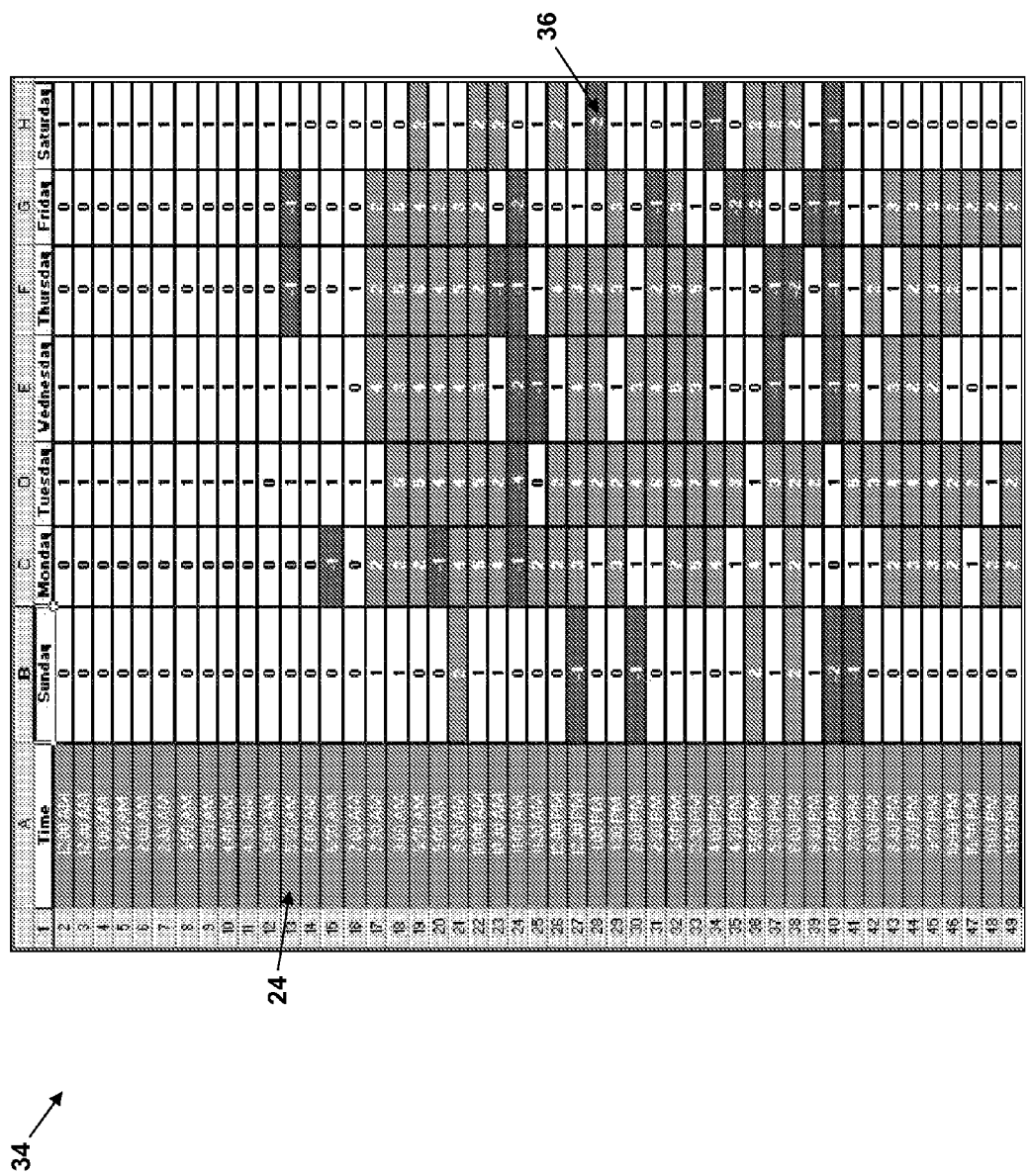
FIG. 8 depicts the estimated staffing chart of FIG. 4 updated in view of the absences marked in the absence table of FIG. 7.
Figure 9:
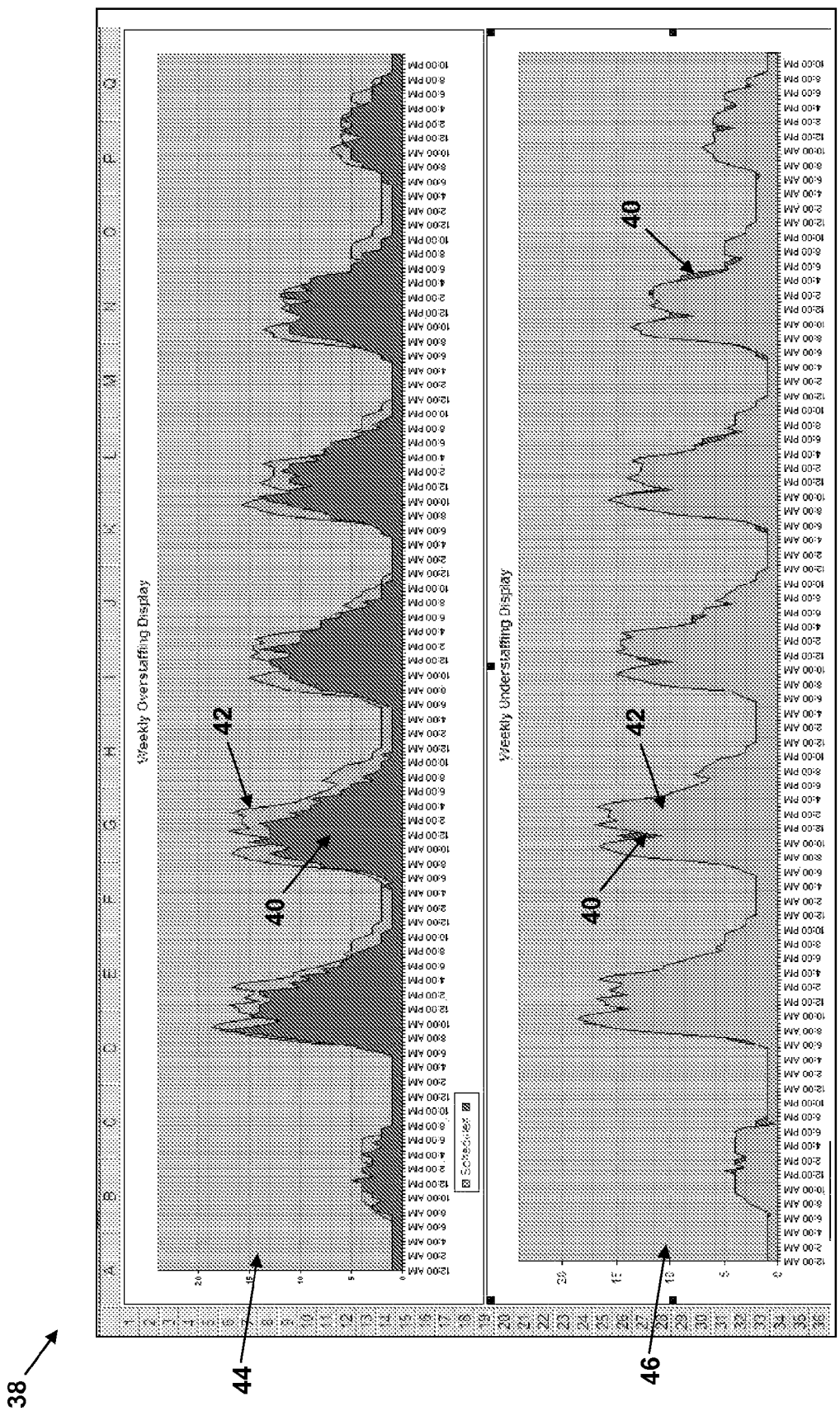
FIG. 9 depicts the call volume graph of FIG. 5 updated in view of the absences marked in the absence table of FIG. 7.

In FIG. 7, the absence chart 50 of FIG. 6 has changed to reflect that four agents 30 will not be available during an upcoming week. In this example, an "X" has been inserted into the absence chart 50 to indicate an absence. That is, any day marked with an "X" in the absence chart 50 removes that agent 30 as if the agent 30 were sick or on vacation. The consequences of the absences is instantaneously reflected in the staffing impact chart 34 as shown in FIG. 8 and in the call volume graph 38 as shown in FIG. 9. The updated staffing impact chart 34 of FIG. 8 now shows for the time interval 24 from 11:00 AM to 11:30 AM:

Sunday—Ideal staffing;
Monday—Understaffed by 1 agent;
Tuesday—Understaffed by 4 agents;
Wednesday—Understaffed by 2 agents;
Thursday—Understaffed by 1 agent;
Friday—Understaffed by 2 agents; and
Saturday—Ideal staffing.

Comparing the staffing impact charts 34 of FIGS. 4 and 8, it is readily apparent (e.g., from the color coding) that the absence of the four agents 30 will greatly impact the estimated staffing need for that week.

The absence table 50 can be manipulated to correct staffing problems. For example, if there is a staffing surplus on a Friday and a staffing deficit on a Monday, the schedules of one or more agents 30 can be changed to fix Friday's surplus and Monday's deficit. Thus, the estimation tool 10 can be used to adjust the schedules of agent(s) 30 for proper call coverage in the call center 14. Agents 30 can also be selectively added for additional call coverage using an overtime chart 52, such as that depicted in FIG. 10. The consequences of the addition of agents 30 via the overtime chart 52 are also instantaneously reflected in the staffing impact chart 34 and the call volume graph 38.

As further depicted in FIG. 1, a variable table 56 can also be provided to the estimation tool 10. The variable table 56 is shown in greater detail in FIG. 11. The variable table 56 provides a user with the ability to change a plurality of different variables and to immediately view the impact of such changes in the staffing impact chart 34 and the call volume graph 38. For example, a user can adjust the average handling time of calls 32 by inserting a value into box 58 of the variable table 56. In response, the staffing impact chart 34 is immediately updated to reflect the change in the average handling time of calls 32. As an example, when the average handling time of calls 32 is increased by 1 minute from 6.5 minutes to 7.5 minutes via the variable table 56, the state of the staffing impact chart 34 changes from that shown in FIG. 4 to that shown in FIG. 12. Although not shown, the call volume graph 38 is also updated.

Figure 12:
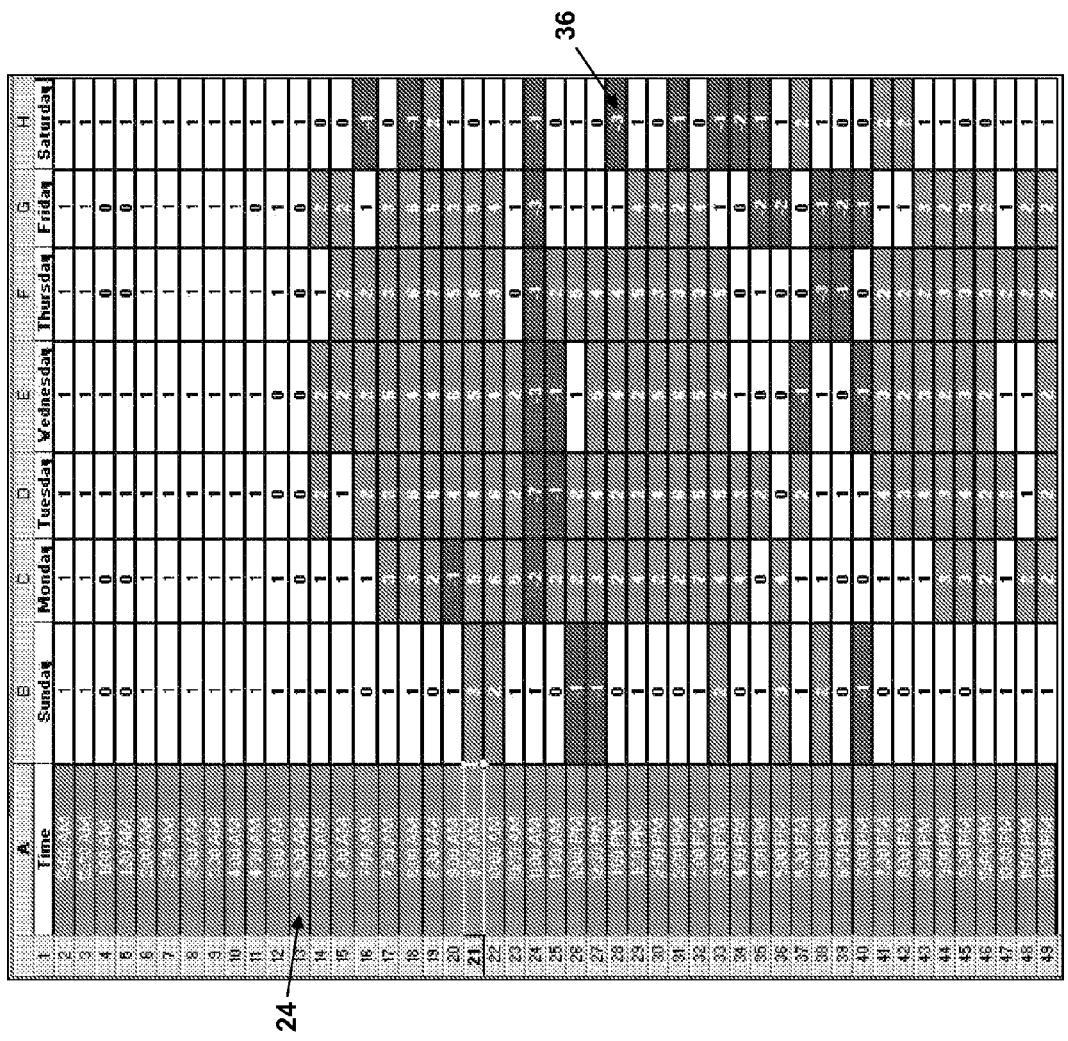
FIG. 12 depicts the estimated staffing chart of FIG. 4 updated in view of an increase in the average handling time of calls entered using the variable table of FIG. 11.

The updated staffing impact chart 34 of FIG. 12 now shows for the time interval 24 from 11:00 AM to 11:30 AM:

Sunday—Overstaffed by 1 agent;
Monday—Understaffed by 2 agents;
Tuesday—Understaffed by 7 agents;
Wednesday—Understaffed by 3 agents;
Thursday—Understaffed by 1 agent;
Friday—Understaffed by 3 agents; and
Saturday—Understaffed by 1 agent.

Comparing the staffing impact charts 34 of FIGS. 4, and 12, it is readily apparent that the increase of 1 minute in the average handling time of calls will greatly impact the estimated staffing need for that week. Further, comparing the staffing impact charts 34 of FIGS. 4, 8, and 12, it is readily apparent that, at least for the time interval from 11:00 AM to 11:30 AM, an increase of 1 minute in the average handling of calls has a greater understaffing impact than the absence of 4 agents.

Figure 13:
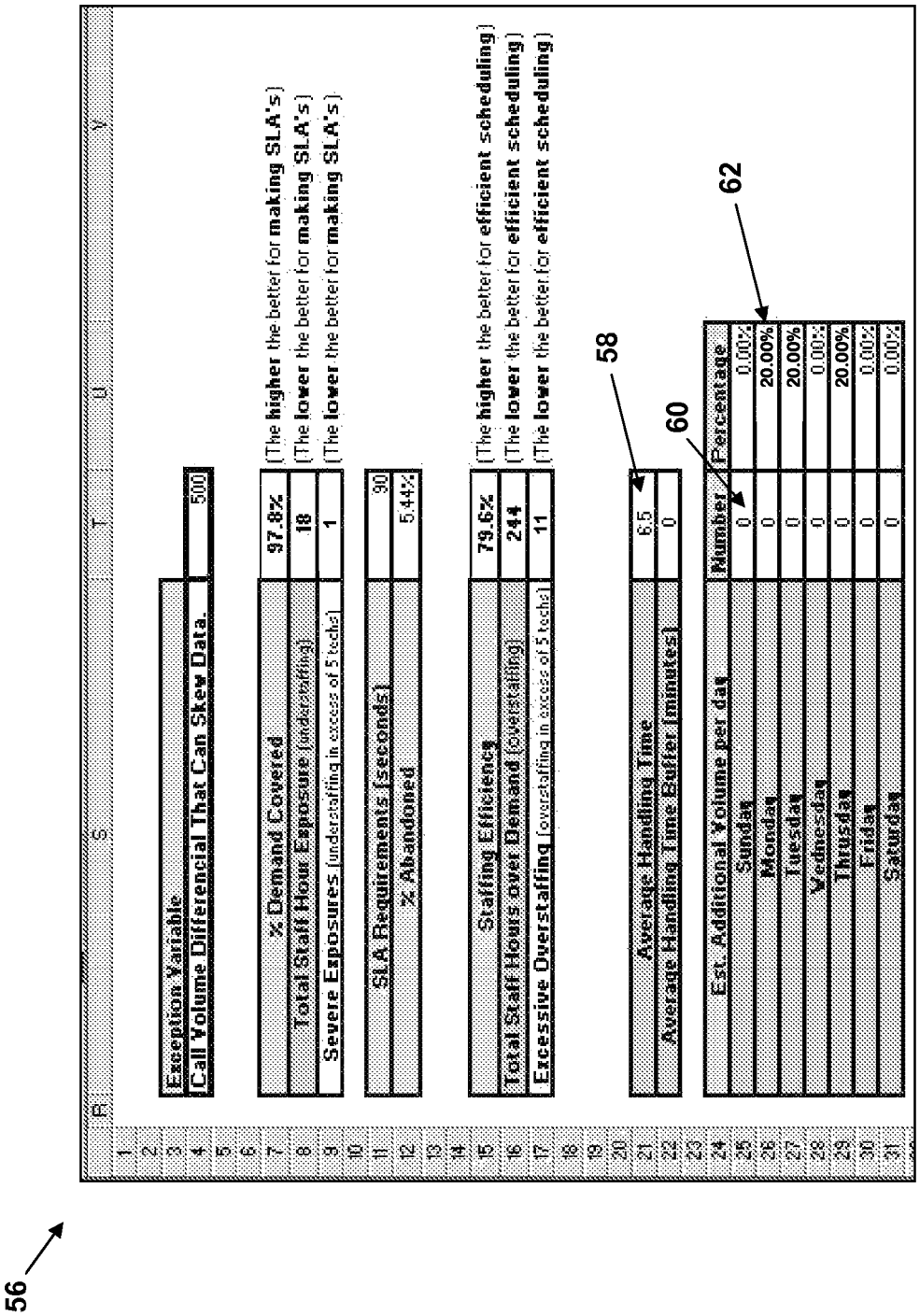
FIG. 13 depicts the illustrative variable table of FIG. 11 with additional call volume entered by a user in accordance with an embodiment of the present invention.

Referring now to FIG. 13, a user can adjust the call volume for one or more days by inserting a number of calls or percent (%) increase in calls in boxes 60, 62, respectively, of the variable table 56. In response, the staffing impact chart 34 is immediately updated to reflect the change in the call volume. The estimation tool 10 divides the increase in calls based on existing volume percentages and graphically shows the effects of the increase. As an example, when a value of 20% is inserted into the boxes 62 for Monday, Tuesday, and Thursday, the state of the staffing impact chart 34 changes from that shown in FIG. 4 to that shown in FIG. 14. Although not shown, the call volume graph 38 is also updated.

Figure 14:
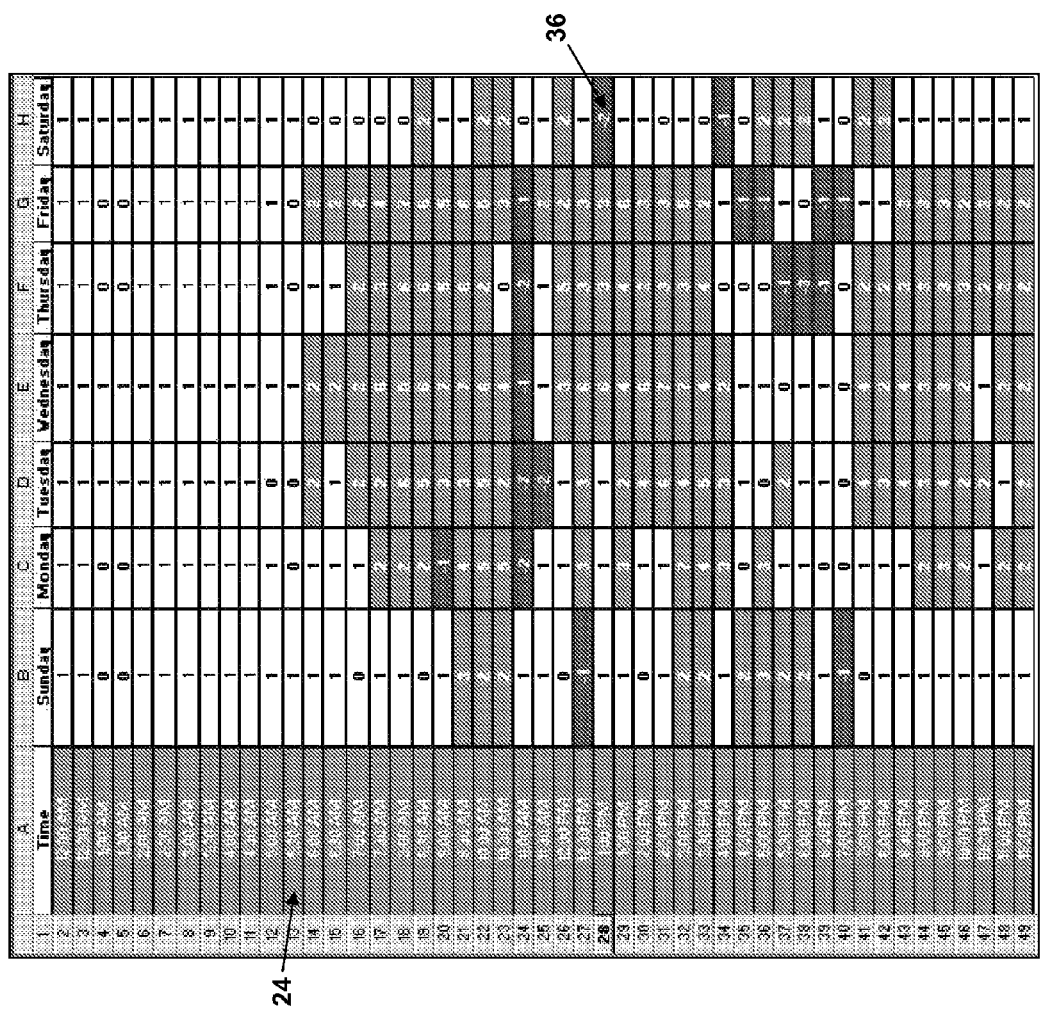
FIG. 14 depicts the estimated staffing chart of FIG. 4 updated in view of the variable table of FIG. 13.

The updated staffing impact chart 34 of FIG. 14 now shows for the time interval 24 from 11:00 AM to 11:30 AM:

Sunday—Overstaffed by 1 agent;
Monday—Understaffed by 2 agents;
Tuesday—Understaffed by 7 agents;
Wednesday—Understaffed by 1 agent;
Thursday—Understaffed by 2 agents;
Friday—Understaffed by 1 agent; and
Saturday—Ideal staffing.

Figure 11:
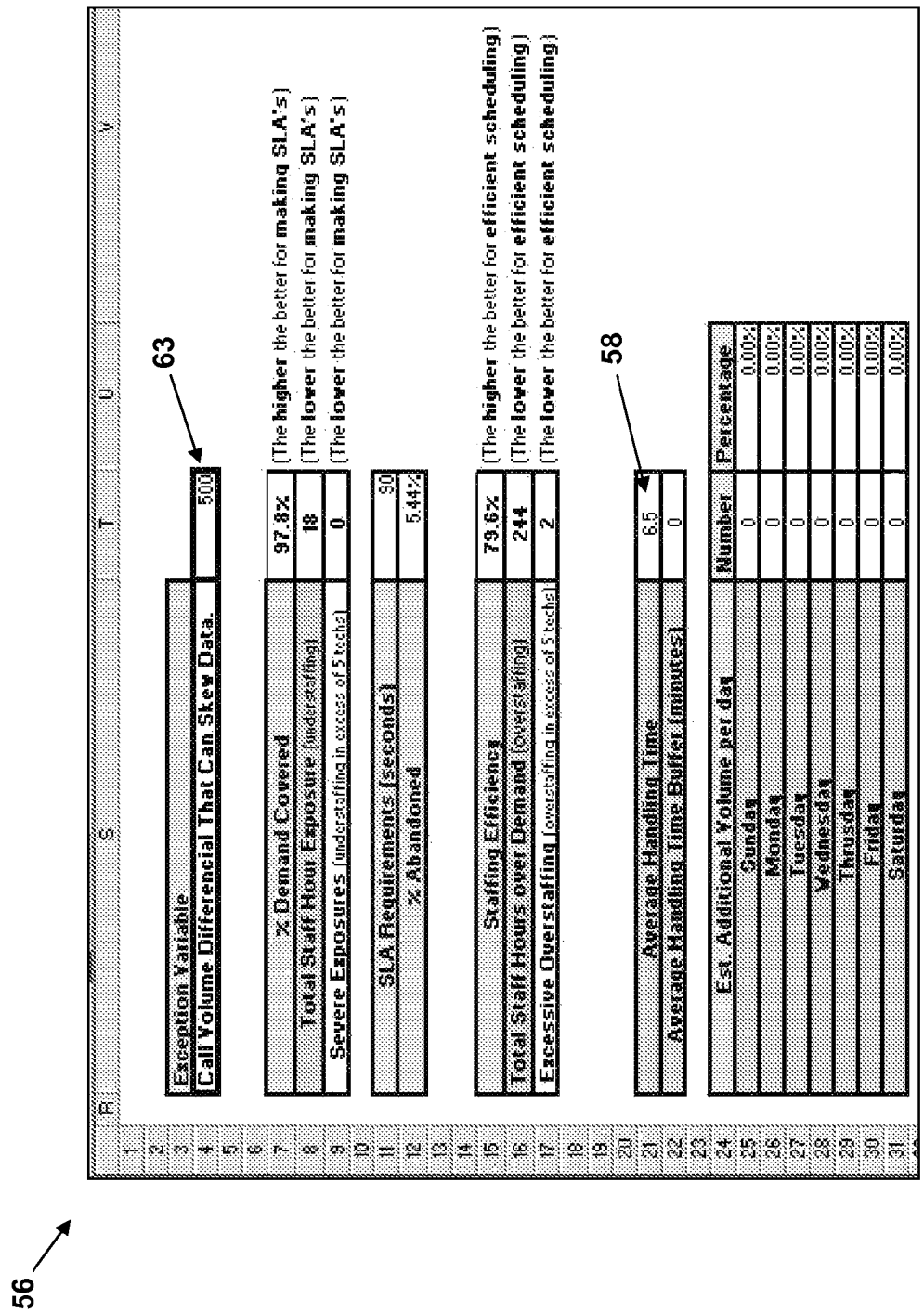
FIG. 11 depicts an illustrative variable table in accordance with an embodiment of the present invention.

The variable table 56 can also be used to provide staffing results. For example, as shown in FIGS. 11 and 13, the variable table 56 provides information such as "% Demand Covered," "SLA Requirements," "Staffing Efficiency," etc. These values can change based on information provided to the estimation tool 10.

Figure 15:
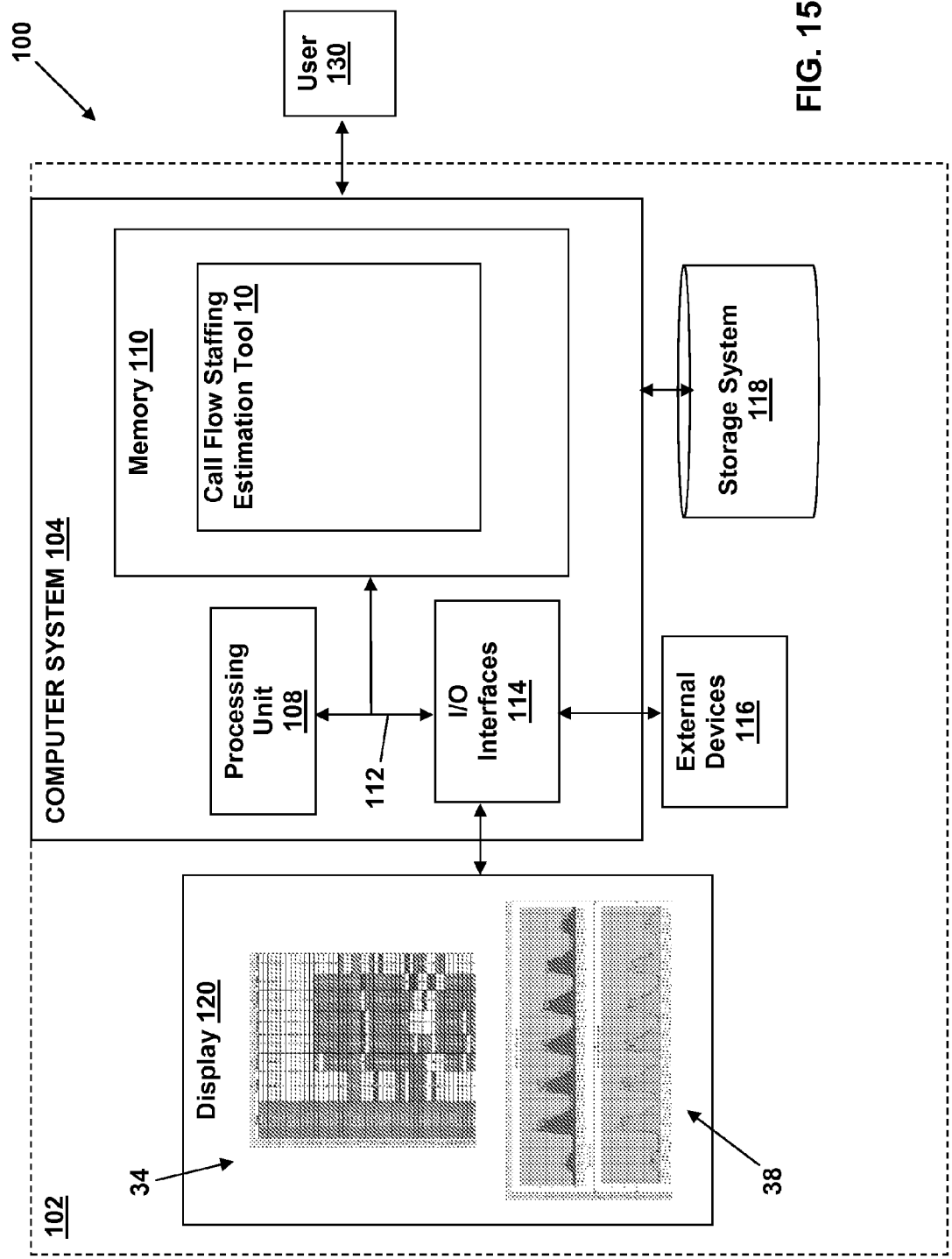
FIG. 15 depicts an illustrative computer system for implementing embodiment(s) of the present invention.

FIG. 15 shows an illustrative system 100 in accordance with embodiment(s) of the present invention. The system 100 includes a computer infrastructure 102 that can perform the various process steps described herein. In particular, the computer infrastructure 102 is shown as including a computer system 104 that comprises a call flow staffing estimation tool 10 in accordance with the present invention.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as the call flow staffing estimation tool 10, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device 116 can comprise any device (e.g., display 120) that enables a user (not shown) to interact with the computer system 104 or any device that enables the computer system 104 to communicate with one or more other computer systems.

The computer system 104 can comprise any general purpose computing article of manufacture capable of executing computer program code installed by a user (e.g., a personal computer, server, handheld device, etc.). However, it is understood that the computer system 104 and the call flow staffing estimation tool 10 are only representative of various possible computer systems that may perform the various process steps of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in one embodiment, the computer infrastructure 102 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

The call flow staffing estimation tool 10 enables the computer system 104 to predict call volume based on previous call arrival patterns and to make instant changes to account for unexpected variables. A user 130 can provide input to the call flow staffing estimation tool 10, as shown in FIG. 1, via an absence table 50, an overtime chart 52, an absence table 50, and a variable table 56. These components are discussed above in greater detail. It is understood that some of the various systems shown in FIG. 15 can be implemented independently, combined, and/or stored in memory for one or more separate computer systems 104 that communicate over a network. Further, it is understood that some of the systems and/or functionality may not be implemented, or additional systems and/or functionality may be included as part of the system 100.

The call flow staffing estimation tool 10 can be provided as computer program code on a computer-readable medium. To this extent, the computer-readable medium includes program code, such as the call flow staffing estimation tool 10, which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to provide a call flow staffing estimation tool 10 in accordance with the present invention. In this case, the service provider can create, maintain, support, etc., a computer infrastructure, such as the computer infrastructure 102, that performs the process steps of the invention for one or more customers. In return, the service provider can receive payment from the customer(s) under a subscription and/or fee agreement and/or the service provider can receive payment from the sale of advertising space to one or more third parties.

A computer infrastructure, such as the computer infrastructure 102, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for predicting call volume, comprising:
generating a staffing impact chart that indicates, in a visually indicated display, an expected difference between call volume and available agents for a plurality of time intervals in a future period of time based on a plurality of inputs, the plurality of inputs including: historical call volume data to a call center, a prospective schedule of agents servicing the call center, and an average handing time of calls to the call center by the agents, wherein historical call volume data which is skewed data is ignored and predetermined representative data is substituted for the skewed data;
providing a variable table having a plurality of variables, each variable including a scaling value that modifies at least one of the plurality of inputs used in generating the staffing impact chart;
selectively changing, by a user, at least one of the variables in the variable table; and
immediately updating the staffing impact chart to reflect modified expected differences for each of the plurality of time intervals based on application of the change to the plurality of inputs.

2. The method of claim 1, further comprising:
providing the historical call volume data using a telephone switch monitoring tool.

3. The method of claim 1, further comprising:
generating daily and weekly historical call volume charts that provide average call volume data.

4. The method of claim 1, wherein the staffing impact chart provides an indicator representative of an estimated staffing need for the future period of time for each of a plurality of time intervals.

5. The method of claim 4, wherein the indicator comprises a number representing a staffing surplus or a staffing deficit.

6. The method of claim 4, wherein the indicator comprises a first color indicating an overstaffing condition and a second color indicating an understaffing condition.

7. The method of claim 1, further comprising:
generating a call volume graph that indicates an expected difference between call volume and available agents for a future period of time based on the historical call volume data to the call center, the schedule of agents servicing the call center, and the average handing time of calls to the call center by the agents; and immediately updating the call volume graph to reflect the change.

8. The method of claim 1, wherein selectively changing an input to the generating step further comprises:
providing at least one of an absence table and an overtime table; and
dynamically adjusting a schedule of at least one of the agents in the call center using at least one of the absence table and the overtime table, wherein the staffing impact chart is immediately updated to reflect the adjustment.

9. The method of claim 1, wherein selectively changing an input to the generating step further comprises:
dynamically changing at least one of the average handing time of calls and the call volume in the variable table; and
immediately updating the staffing impact chart to reflect the adjustment.

10. A system for predicting call volume, comprising:
a system for generating a staffing impact chart that indicates, in a visually indicated display, an expected difference between call volume and available agents for a future period of time based on a plurality of inputs, the plurality of inputs including: historical call volume data to a call center, a schedule of agents servicing the call center, and an average handing time of calls to the call center by the agents, wherein historical call volume data which is skewed data is ignored and predetermined representative data is substituted for the skewed data;
a system for providing a variable table having a plurality of variables, each variable including a scaling value that modifies at least one of the plurality of inputs used in generating the staffing impact chart;
a system for selectively changing, by a user, at least one of the variables in the variable table; and
a system for immediately updating the staffing impact chart to reflect modified expected differences for each of the plurality of time intervals based on application of the change to the plurality of inputs.

11. The system of claim 10, further comprising:
a system for providing the historical call volume data using a telephone switch monitoring tool.

12. The system of claim 10, further comprising:
a system for generating daily and weekly historical call volume charts that provide average call volume data.

13. The system of claim 10, wherein the staffing impact chart provides an indicator representative of an estimated staffing need for the future period of time for each of a plurality of time intervals.

14. The system of claim 13, wherein the indicator comprises a number representing a staffing surplus or a staffing deficit.

15. The system of claim 13, wherein the indicator comprises a first color indicating an overstaffing condition and a second color indicating an understaffing condition.

16. The system of claim 10, further comprising:
a system for generating a call volume graph that indicates an expected difference between call volume and available agents for a future period of time based on the historical call volume data to the call center, the schedule of agents servicing the call center, and the average handing time of calls to the call center by the agents; and
a system for immediately updating the call volume graph to reflect the change.

17. The system of claim 10, wherein the system for selectively changing an input to the generating step further comprises:
at least one of an absence table and an overtime table; and
a system for dynamically adjusting a schedule of at least one of the agents in the call center using at least one of the absence table and the overtime table, wherein the staffing impact chart is immediately updated to reflect the adjustment.

18. The system of claim 10, wherein the system for selectively changing an input to the generating step further comprises:
a system for dynamically changing at least one of the average handing time of calls and the call volume in the variable table; and
a system for immediately updating the staffing impact chart to reflect the adjustment.

19. A program product stored on a computer readable storage medium for predicting call volume, the computer readable storage medium comprising program code for:
generating a staffing impact chart that indicates, in a visually indicated display, an expected difference between call volume and available agents for a plurality of time intervals in a future period of time based on a plurality of inputs, the plurality of inputs including: historical call volume data to a call center, a prospective schedule of agents servicing the call center, and an average handing time of calls to the call center by the agents, wherein historical call volume data which is skewed data is ignored and predetermined representative data is substituted for the skewed data;
providing a variable table having a plurality of variables, each variable including a scaling value that modifies at least one of the plurality of inputs used in generating the staffing impact chart;
selectively changing, by a user, at least one of the variables in the variable table to the generating step; and
immediately updating the staffing impact chart to reflect modified expected differences for each of the plurality of time intervals based on application of the change to the plurality of inputs.

* * * * *